United States Patent
Lolas et al.

(10) Patent No.: US 8,479,497 B2
(45) Date of Patent: Jul. 9, 2013

(54) METHOD FOR OPERATING AN SCR-CATALYTIC CONVERTER

(75) Inventors: Georgios Lolas, Stuttgart (DE);
Wolfgang Klenk, Loechgau (DE);
Andreas Wagner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 12/729,945

(22) Filed: Mar. 23, 2010

(65) Prior Publication Data
US 2010/0236243 A1    Sep. 23, 2010

(30) Foreign Application Priority Data

Mar. 23, 2009   (DE) .................. 10 2009 001 736

(51) Int. Cl.
*F01N 3/00*       (2006.01)
(52) U.S. Cl.
USPC .................. 60/286; 60/283; 60/295; 60/301; 60/303
(58) Field of Classification Search
USPC .................. 60/274, 286, 295, 301, 303, 277, 60/283
See application file for complete search history.

(56) References Cited

U.S. PATENT DOCUMENTS

| | | | | |
|---|---|---|---|---|
| 6,363,771 | B1 * | 4/2002 | Liang et al. | 73/23.31 |
| 7,449,162 | B2 * | 11/2008 | Schaller et al. | 423/212 |
| 7,912,360 | B2 * | 3/2011 | Gschwind | 392/456 |
| 7,930,878 | B2 * | 4/2011 | Cook et al. | 60/286 |
| 8,069,649 | B2 * | 12/2011 | Matsunaga | 60/277 |
| 2007/0079601 | A1 | 4/2007 | Hirata et al. | |
| 2010/0050606 | A1 * | 3/2010 | Fulks et al. | 60/286 |

FOREIGN PATENT DOCUMENTS

| | | |
|---|---|---|
| DE | 10 2006 053 3 | 7/2007 |
| EP | 2 161 422 A2 | 3/2010 |
| WO | WO 2010/054733 A1 | 5/2010 |

* cited by examiner

*Primary Examiner* — Binh Q Tran
(74) *Attorney, Agent, or Firm* — Merchant & Gould P.C.

(57) ABSTRACT

The invention provides for a method for operating an SCR catalytic converter for the aftertreatment of exhaust gases of an internal combustion engine, wherein a reducing agent tank (1) with reducing agent and a reducing agent metering device (8) are provided. The reducing agent tank (1) has at least one tank heater (3) having PTC characteristics. A variable characterizing the heater current is acquired for detecting cavities (10) in the reducing agent tank (1) when the reducing agent is frozen. The presence of cavities is suggested from a deviation of the acquired value or values for the variable characterizing the heater current from a predeterminable reference value, which represents a reducing agent tank without cavities.

7 Claims, 3 Drawing Sheets

METHOD FOR OPERATING AN SCR-CATALYTIC CONVERTER

This application claims benefit of Serial No. 10 2009 001 736.4, filed 23 Mar. 2009 in Germany and which application is incorporated herein by reference. To the extent appropriate, a claim of priority is made to the above disclosed applications.

BACKGROUND

The present invention relates to a method for operating an SCR catalytic converter for the aftertreatment of exhaust gases of an internal combustion engine, wherein a heatable reducing agent tank for the required liquid reducing agent is provided, and the tank heater has PTC characteristics. Additional items of the present invention are a computer program and a computer program product, which are suited for carrying out the method.

Methods and devices for operating an internal combustion engine are known, in whose exhaust gas region an SCR catalytic converter (Selective Catalytic Reduction) is disposed, which reduces the nitrogen oxides ($NO_x$) contained in the exhaust gas of the internal combustion engine to nitrogen in the presence of a reducing agent. In so doing, the nitrogen oxides in the exhaust gas can be considerably reduced. Nitrogen oxides ($NO$, $NO_2$) are thereby preferably reduced while undesirable side reactions are largely suppressed. Ammonia ($NH_3$), which is added to the exhaust gas, is needed for the reaction process. As a rule, $NH_3$ detaching reagents are used as the reducing agent. An aqueous urea solution is often used.

The required aqueous urea solution (HWL) for the exhaust gas aftertreatment is held available in a reducing agent tank and is sprayed into the exhaust gas tract dependent on requirements via a reducing agent metering device. Depending upon the anti-freeze added, the aqueous urea solution freezes at −11 E C or lower. A tank heater is provided as a rule to thaw the aqueous urea solution. Provided that the aqueous urea solution is completely frozen, the system start-up can be delayed in order to thaw a required amount of the urea solution in this time. Provided that a temperature is detected in the tank, which is lower than the freezing threshold, the tank heater is activated so that at least a minimum amount of the aqueous urea solution can be thawed. Ohmic heating elements as well as PTC elements are conventionally installed in a tank heater. PTC elements are electrical resistors with temperature dependent behavior. The resistance of a PTC element increases with rising temperatures so that the current flow is reduced. It is hereby assured that a pronounced overheating or a continuous current feed does not occur.

A problem with a reducing agent tank with a completely frozen urea solution is that the output introduced by the tank heater during a relatively short driving cycle, for example less than two to three hours, can only thaw a limited volume of the reducing agent around the heater. A portion of said volume is extracted via the reducing agent metering device and is sprayed into the exhaust gas tract for the exhaust gas aftertreatment. A cavity, in particular a gas bubble, respectively air bubble, forms in the region of the tank heater as a result of the extraction of the liquid reducing agent. Provided that the urea solution subsequently refreezes and this process repeatedly occurs, the cavity enlarges so that the tank heater is eventually for the most part surrounded by gas, respectively air. As a result, the heat flow in the reducing agent tank greatly decreases on account of the air insulation and no longer can a sufficient amount of reducing agent be thawed. The system pressure breaks down and a metering of the reducing agent into the exhaust gas tract is no longer possible. This leads as a rule to an error message relevant to the OBD (on-board-diagnosis) system.

The aim behind the invention is to provide a solution to this problem and to assure the operability of the SCR catalytic converter even at low temperatures.

This aim is met by a method for operating an SCR catalytic converter.

SUMMARY

The method according to the invention is provided for the operation of an SCR catalytic converter for the aftertreatment of exhaust gases of an internal combustion engine, wherein a reducing agent tank with reducing agent and a reducing agent metering device are provided. The reducing agent tank has at least one tank heater for thawing a frozen reducing agent solution, said tank heater having PTC characteristics. The method according to the invention is thereby characterized in that a variable characterizing the heater current is acquired for detecting cavities in the reducing agent tank, which form as a result of extracting liquid reducing agent when the reducing agent in the tank is only partially thawed and in that the presence of cavities is suggested by a deviation of the acquired value or values for the variable characterizing the heater current from a predeterminable reference value. In so doing, the reference value or reference values represents a reducing agent tank without cavities, i.e. without, for example, gas bubble or air inclusions. The method according to the invention is based on the knowledge that the resistance increases, respectively the heater current decreases, in a tank heater having PTC characteristics when the surface temperature of said heater increases. When a cavity begins to form in the region of the tank heater, said heater can no longer give off sufficient heat to the fluid so that the surface of the tank heater heats up and the current flow decreases according to the PTC characteristics of the tank heater. The effect becomes more pronounced when the cavity enlarges. The presence of a cavity, respectively a gas bubble, and if need be its extent can therefore be suggested by acquiring a variable characterizing the heater current and comparing said variable with a reference value.

In a preferred embodiment of the method according to the invention, the current, particularly a current maximum, is acquired as the variable characterizing the heater current. When the temperature of the tank heater increases, the current flow of the heater drops so that the presence of one or a plurality of cavities, respectively gas inclusions, is suggested when a predeterminable reference value ($I_S$), respectively a predeterminable threshold, is undershot. The comparison of the current measured value and the reference value occurs particularly within a predeterminable time interval.

In a further preferred embodiment of the method according to the invention, the resistance, in particular the resistance minimum, of the tank heating element is acquired as the variable characterizing the heater current. Because the resistance increases when the temperature of the tank heater increases, the presence of cavities are suggested in this embodiment when a predeterminable threshold, respectively a predeterminable reference value ($R_S$), has been exceeded. The comparison of the current measured value and the reference value particularly occurs within a predeterminable time interval.

The test for the presence of cavities preferably occurs continuously at least during winter operation if the heating of the SCR system runs continuously. In addition, a selective monitoring for the presence of cavities can be carried out, for example after starting the engine, respectively cold starting the engine. As the case may be, a monitoring at a defined and predeterminable point in time can be more accurate because in this instance defined starting conditions can be assumed. A selective monitoring at a defined point in time is preferably carried out in addition to the continuous monitoring.

Preferably before acquiring a variable characterizing the heater current, the tank heater is measured, respectively calibrated, by the PTC characteristics being determined at predeterminable conditions, for example at a predeterminable voltage. In so doing the exemplary distribution of the heat output of the respective installed tank heater can be taken into account and suitable reference values, respectively comparative values, can be determined and provided.

If one or a plurality of cavities is detected according to the invention, preferably one or a plurality of reactions is triggered in order to secure or restore the operability of the system. Particularly when cavities are detected, the reducing agent metering quantity is limited and/or stopped, the delivery of reducing agent out of the reducing agent tank is reduced and/or stopped and/or reducing agent is delivered back into the reducing agent tank.

The invention furthermore comprises a computer program, which executes all of the steps of the method according to the invention if said program runs on a computer or in a control unit. Finally the invention comprises a computer program product with a program code, which is stored on a machine-readable carrier, for carrying out the method according to the invention if the program is executed on a computer or in a control unit. The control unit particularly relates to the control unit of an internal combustion engine, with which an SCR catalytic converter for the aftertreatment of the exhaust gases of said internal combustion engine is associated, a reducing agent tank being provided, which is checked for cavities according to the invention.

Further characteristics and advantages of the invention become apparent in the following description of the figures in connection with the embodiments. In this context, the different characteristics can be implemented in each case by themselves or in combination with one another.

DETAILED DESCRIPTION

Figure 1:
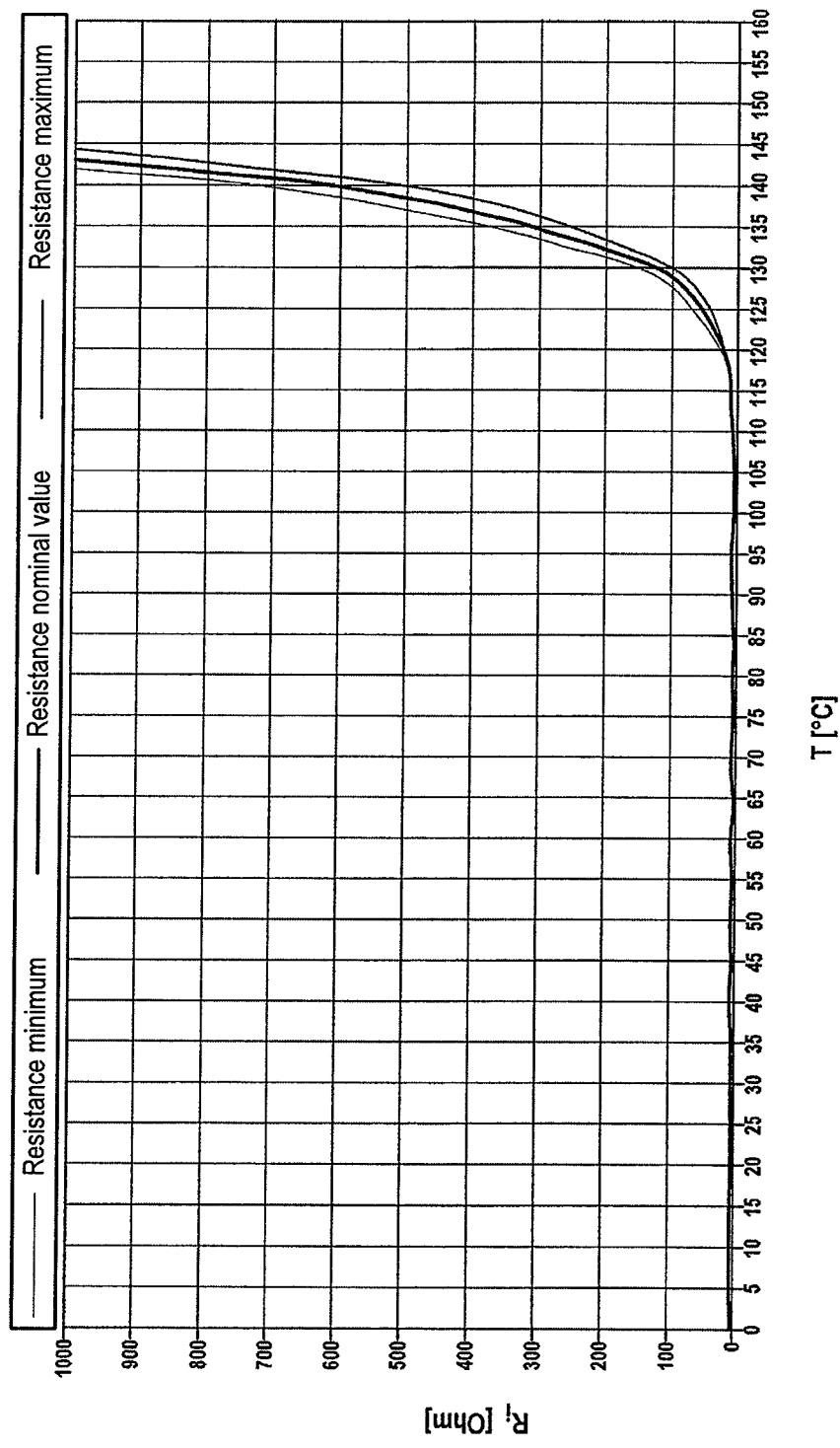
FIG. 1 is characteristic curve of a PTC heating element of a tank heater.

The PTC characteristics of a tank heater are pointed out in FIG. 1. The internal resistance of the PTC element increases with increasing temperature so that the current flow decreases. This positive temperature coefficient of the PTC elements, respectively PTC resistances, is achieved by using electrically conductive materials, so-called PTC thermistors, which conduct the current better at low temperatures than at high ones.

The characteristic current curve of a PTC tank heater is used according to the invention for detecting a cavity in a tank heater, which can occur when the fluid around the tank heater is frozen by means of extraction by suction of partially thawed fluid.

Figure 2:
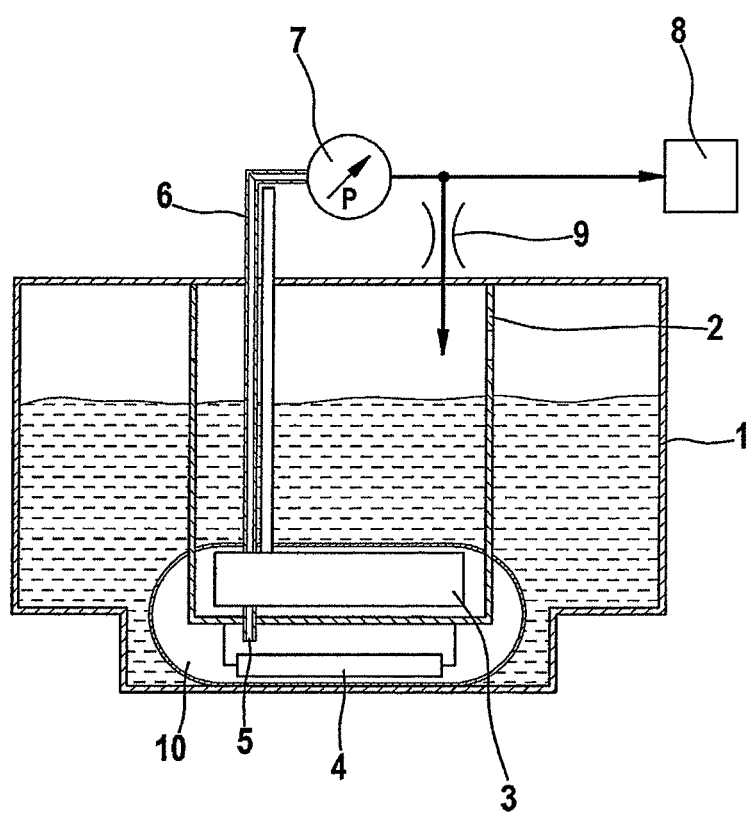
FIG. 2 is schematic depiction of a reducing agent tank with frozen fluid and cavity formation around the suction point and
FIG. 3 is schematic flow diagram for carrying out the method according to the invention.

FIG. 2 illustrates the formation of a cavity in a reducing agent tank, which is filled with reducing agent, particularly aqueous urea solution (HWL). The reducing agent tank 1 comprises an internal heating container 2. A tank heater 3 is disposed inside the heating container 2. A filter 4 is provided beneath the tank heater 3. Said filter 4 assures that via the suction point 5 liquid urea solution is drawn through the suction pipe 6 to the metering device 8 by means of the aqueous urea solution pump 7. Reducing agent can be carried back to the reducing agent tank 1 via the regulating stop valve 9.

When temperatures are below the freezing point of the aqueous urea solution, particularly below −11 EC, the solution freezes in the reducing agent tank 1. In order to nevertheless assure the provision of liquid solution for the exhaust gas aftertreatment, the urea solution is thawed by the tank heater 3. As soon as a minimum quantity of the solution has thawed, the liquid fluid can be extracted by suction via the suction point 5 and supplied to the metering device 8. Provided that only a partial quantity of the urea solution is thawed, particularly in the case of a relatively short driving cycle, and this liquid solution is partially or completely extracted to the exhaust gas aftertreatment, a hollow space, respectively a cavity 10, forms around the suction point 5, respectively around the heater 3. The heat flow is significantly reduced by the air insulation in this cavity 10, which is filled with gas, respectively air, so that a sufficient quantity of reducing agent can no longer be thawed by the heater 3. The state of an existing cavity in the reducing agent tank 1 can be detected according to the invention by means of an analysis of the heater current, which exhibits PTC characteristics. Because the tank heater 3 gives off heat to the reducing agent solution only to a limited extent when the cavity 10 is beginning to form, the surface of the tank heater 3 heats up, and the current decreases corresponding to the PTC characteristics of the tank heater. The presence of cavities is suggested by comparison with reference values, which represent a reducing agent tank with reducing agent without cavities. The resistance or the heater current is particularly suitable as a variable for the reference value.

In order to take the exemplary distribution of the heat output of the installed tank heater into account, the heater is preferably measured, respectively classified, at defined boundary conditions. For this purpose, the heater is energized for a few seconds. The PTC characteristics have a resistance minimum, which is thereby passed through, and a current peak results. By means of an analysis of the height of the acquired current peak at a given voltage, the installed heater can be classified, respectively its minimum resistance can be determined. A current threshold can be defined with the minimum resistance that was ascertained. When the heater current is undershot during the operation for an applicable, respectively predeterminable, minimum duration, a cavity is suggested. A status can preferably be set in this case, by which different reactions can be triggered in order to protect the system from a breakdown in the system pressure and an error entry related to said breakdown. In this instance, a metering quantity stop or a metering amount limitation can particularly be triggered. Furthermore, a delivery stop for reducing agent and/or a delivery of reducing agent back into the reducing agent tank and/or a pausing in the secure after-run state can, for example, be triggered in order to increase the quantity of liquid reducing agent in the reducing agent tank and in so doing to partially or completely remove the cavity and thereby to again improve the heat output.

Figure 3:
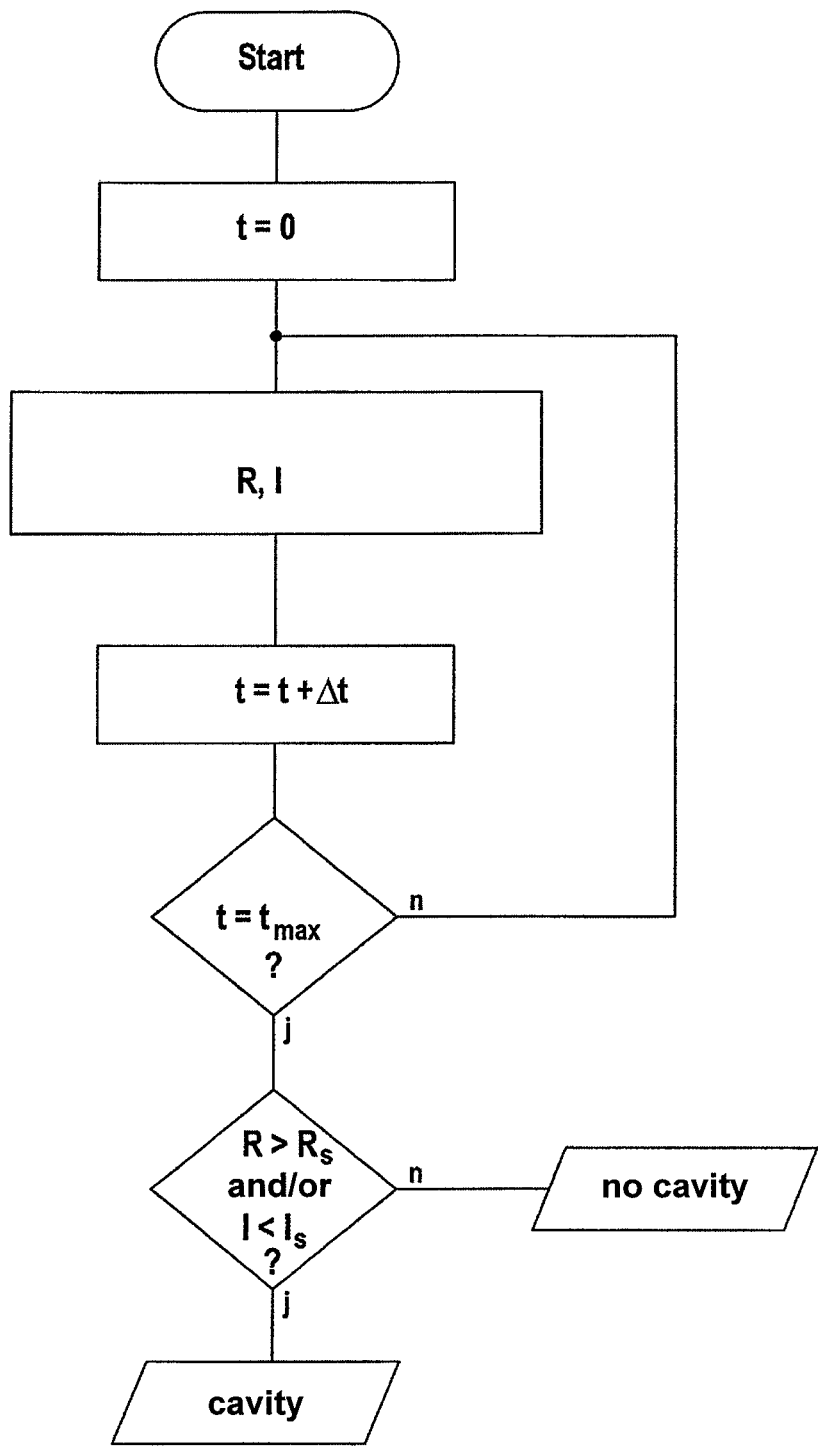

A schematic flow diagram for carrying out the method according to the invention is shown in FIG. 3. Before carrying out the detection of cavities in the reducing agent tank, threshold values $R_S$ and/or $I_S$ for the internal resistance R and the current I are predetermined. When carrying out the method, measurement values for the internal resistance R and/or the current I are recorded in a predetermined time interval between t=0 and t=$t_{max}$ at the measurement times t=t+Δt. As soon as t=$t_{max}$ has been achieved, a test is made to determine whether the maximum value of the internal resistance R is greater than the threshold value $R_S$ and/or whether the maximum value for the current I is smaller than the threshold value $I_S$. Provided that this is the case, a cavity is suggested. Provided that this is not the case, the presence of a cavity is not suggested.

The invention claimed is:

1. Method for operating an SCR catalytic converter for the aftertreatment of exhaust gases of an internal combustion engine, wherein a reducing agent tank with reducing agent and a reducing agent metering device are provided, and the reducing agent tank has at least one tank heater having Positive Temperature Coefficient (PCT) characteristics, comprising determining the presence of cavities in the reducing agent tank with frozen reducing agent by:
   (a) predetermining a reference value representing a reducing agent tank without cavities in frozen reducing agent;
   (b) acquiring a variable characterizing the heater current;
   (c) comparing the variable to a predetermined reference value representing a reducing agent tank without cavities in frozen reducing agent,
wherein a presence of cavities in the reducing agent tank with frozen reducing agent is suggested from a deviation of the acquired value from the predetermined reference value.

2. The method of claim 1, wherein the variable characterizing the heater current is a current and in that the presence of cavities is suggested when the predetermined reference value is undershot.

3. The method of claim 1, wherein the variable characterizing the heater current is a resistance and in that the presence of cavities is suggested when the predetermined reference value is exceeded.

4. The method claim 1, wherein the tank heater is measured by determining the PTC characteristics at predetermined conditions before a variable characterizing the heater current is acquired.

5. The method of claim 1, wherein when cavities are detected the reducing agent metering quantity is limited or stopped, the delivery of reducing agent out of the reducing agent tank is reduced or stopped and reducing agent is optionally delivered back into the reducing agent tank.

6. A computer program product with the program code stored on a computer readable device and run on a control unit, which executes all of the steps of a method according to claim 1.

7. A computer program product with the program code, which is stored on a machine-readable carrier and executed on a control unit, for carrying out the method according to claim 1.

* * * * *